United States Patent
Mase et al.

(10) Patent No.: US 11,613,021 B2
(45) Date of Patent: Mar. 28, 2023

(54) OPERATION SYSTEM

(71) Applicant: KAWASAKI JUKOGYO KABUSHIKI KAISHA, Kobe (JP)

(72) Inventors: Shohei Mase, Kakogawa (JP); Jun Fujimori, Kakogawa (JP); Masao Takatori, Kobe (JP); Kenji Noguchi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 91 days.

(21) Appl. No.: 16/621,381

(22) PCT Filed: Jun. 11, 2018

(86) PCT No.: PCT/JP2018/022284
§ 371 (c)(1),
(2) Date: Dec. 11, 2019

(87) PCT Pub. No.: WO2018/230517
PCT Pub. Date: Dec. 20, 2018

(65) Prior Publication Data
US 2020/0206938 A1    Jul. 2, 2020

Related U.S. Application Data

(60) Provisional application No. 62/518,804, filed on Jun. 13, 2017.

(51) Int. Cl.
*B25J 9/16*    (2006.01)
*B25J 9/00*    (2006.01)

(52) U.S. Cl.
CPC .......... *B25J 9/1697* (2013.01); *B25J 9/0081* (2013.01); *B25J 9/1664* (2013.01)

(58) Field of Classification Search
CPC ...... B25J 9/1697; B25J 9/0081; B25J 9/1664; G05B 2219/39391
See application file for complete search history.

(56) References Cited

U.S. PATENT DOCUMENTS

| 10,242,438 | B2* | 3/2019 | Watanabe | G06V 10/44 |
| 2008/0125896 | A1 | 5/2008 | Troy et al. | |
| 2011/0234789 | A1* | 9/2011 | Koike | G05B 19/41805 |
| | | | | 348/95 |
| 2012/0294509 | A1* | 11/2012 | Matsumoto | B25J 9/1697 |
| | | | | 382/153 |

(Continued)

FOREIGN PATENT DOCUMENTS

| DE | 102015104582 A1 * | 9/2016 |
| JP | H06-206148 A | 7/1994 |

(Continued)

OTHER PUBLICATIONS

S. Radmard, D. Meger, E. A. Croft and J. J. Little, "Overcoming occlusions in eye-in-hand visual search," 2012 American Control Conference (ACC), 2012, pp. 4102-4107, doi: 10.1109/ACC.2012.6315690. (Year: 2012).*

(Continued)

*Primary Examiner* — Khoi H Tran
*Assistant Examiner* — Tristan J Greiner
(74) *Attorney, Agent, or Firm* — Oliff PLC

(57) ABSTRACT

A robot system including a robot, a marker unit, a sensor, storage device, and a control device. The robot performs an operation with regard to a workpiece. The marker unit is attached to a measurement object and includes a base section and a plurality of markers attached to the base section. The sensor detects identification information and three-dimensional positions of the plurality of markers. The storage device stores teaching data including operation data and attachment position data indicating a correspondence relationship between the identification information of each of the markers and an attachment position of the corresponding (Continued)

marker. The control device calculates a three-dimensional position of the measurement object based on the three-dimensional positions of the plurality of markers and the attachment position data and controls the robot based on the three-dimensional position of the measurement object and the operation data so as to make the robot perform the operation.

7 Claims, 7 Drawing Sheets

(56) References Cited

U.S. PATENT DOCUMENTS

| | | | |
|---|---|---|---|
| 2015/0127161 A1* | 5/2015 | Satou | B25J 9/1697 700/259 |
| 2017/0154397 A1* | 6/2017 | Satou | G06T 7/75 |
| 2018/0046152 A1* | 2/2018 | Fujita | G05B 19/402 |

FOREIGN PATENT DOCUMENTS

| | | |
|---|---|---|
| JP | 2002-018754 A | 1/2002 |
| JP | 2011-167806 A | 9/2011 |
| JP | 2011-209959 A | 10/2011 |
| JP | 2012-254518 A | 12/2012 |
| JP | 2013-175221 A | 9/2013 |
| JP | 2015-136742 A | 7/2015 |
| WO | 2016/151668 A1 | 9/2016 |

OTHER PUBLICATIONS

Elizabeth A Croft, David Meger, James Little, Sina Radmard, Overcoming Occlusions in Eye-in-Hand Visual ?Search, 2012 American Control Conference (Year: 2012).*

Sep. 4, 2018 Intenrational Search Report issued in International Patent Application No. PCT/JP2018/022284.

* cited by examiner

OPERATION SYSTEM

TECHNICAL FIELD

The present invention relates mainly to an operation system which controls an operation device so as to make the operation device perform an operation.

BACKGROUND ART

A robot apparatus of Patent Literature 1 comprises a gripper, a robot arm, a CCD camera, and a robot controller. The gripper grips an operation object. The robot arm has the gripper attached to a tip thereof, so as to move the gripper. The CCD camera is fixed close to the gripper so as to obtain a pictorial image (whose pixels are each set in luminance) of a conveyor conveying a workpiece. The robot controller controls the robot arm and the gripper based on the pictorial image obtained by the CCD camera so as to make the gripper grip the workpiece.

A system of Patent Literature 2 detects position and direction of a vehicle. The vehicle is provided with a plurality of markers. A plurality of motion capture cameras are disposed around the vehicle. The motion capture cameras detect positions of the markers of the vehicle. Accordingly, the position and direction of the vehicle can be calculated, and a movement of the vehicle as a time variation of the position and direction can also be calculated.

CITATION LIST

Patent Literature

Patent Literature 1: Patent Application Laid Open Gazette No. 2002-18754
Patent Literature 2: Patent Application Laid Open Gazette No. 2013-175221

SUMMARY OF THE INVENTION

Problem to be Solved by the Invention

Regarding Patent Literature 1, the position of the workpiece (especially, the position in its deep direction) may be inaccurately obtained because the position detection of the workpiece is based on the pictorial image obtained by the CCD camera. Regarding Patent Literature 2, it fails to detail how to attach the markers to the vehicle.

The present invention is created in view of the above-mentioned situation. A main object of the invention is to provide an operation system which performs an operation in consideration of an accurate three-dimensional position of a measurement object with markers.

Solution to the Problem

The foregoing description is given of the problem to be solved by the invention. Solution to the problem and effects of the solution will now be described.

In an aspect of the invention, provided is an operation system having the following configuration. The operation system comprises an operation device, a marker unit, a sensor, a storage device, and a control device. The operation device performs an operation with regard to a workpiece serving as an operation object. The marker unit is attached to a measurement object which is at least one of the workpiece, the operation device, an object fixed in position relative to the workpiece and an object defining an operation area. The marker unit includes a base section and a plurality of markers attached to the base section. The sensor detects identification information and three-dimensional positions of the plurality of markers included in the marker unit. The storage device stores teaching data including attachment position data and operation data, the attachment data indicating a correspondence relationship between the identification information of each of the markers and an attachment position of the corresponding marker, and the operation data indicating operation content of the operation performed by the operation device. The control device calculates a three-dimensional position of the measurement object based on the three-dimensional positions of the plurality of markers detected by the sensor and the attachment position data stored in the storage device and controls the operation device based on the three-dimensional position of the measurement object and the operation data so as to make the operation device perform the operation.

Therefore, the three-dimensional positions of the markers are detected so that the operation can be performed in consideration of the accurate three-dimensional position of the measurement object. The marker unit enables collective handling of the markers, thereby lightening labor for arranging the markers.

Effect of the Invention

The invention enables to provide an operation system which performs an operation by using markers in consideration of an accurate three-dimensional position of a measurement object.

DETAILED DESCRIPTION OF EMBODIMENTS

Figure 1:
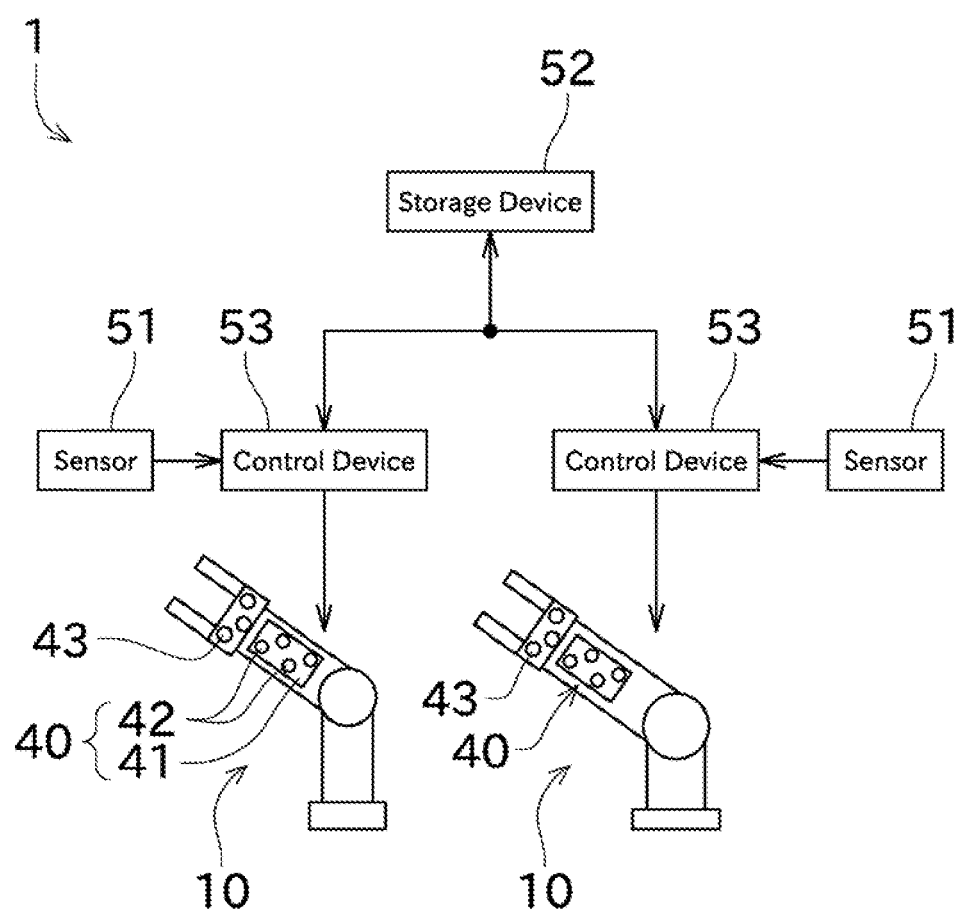
FIG. 1 A block diagram illustrating configuration of a robot system according to a first embodiment.

An embodiment of the present invention will now be described with reference to drawings. First, referring to FIG. 1, a summary of a robot system 1 is described. FIG. 1 is a perspective view of configuration of the robot system 1 according to a first embodiment.

As shown in FIG. 1, the robot system (serving as an operation system) 1 comprises a robot (serving as an operation device) 10, a sensor 51, a storage device 52, and a control device 53. Moreover, according to the present embodiment, the robot system 1 comprises a plurality of robots 10, a plurality of sensors 51 and a plurality of control devices 53 because the plurality of robots 10 are required to perform operations. Alternatively, the robot system 1 may comprise the single robot 10, the single sensor 51, and the single control device 53.

The robot system (serving as the operation system) 1 is a system for making the robots 10 perform operations. Various operations can be considered as the operations performed by the robots 10. For example, the operations are conveyance, assembling, mechanical processing, painting, and cleaning. Each sensor 51 detects positions, attitudes and so on of the corresponding robot 10 and its surrounds. In this regard, the attitude means a direction of a concerned member, e.g., a rotation angle of a rotary shaft or rotary shafts through a center of the member.

The storage device 52 includes a storage section, e.g., a ROM, a flash memory or an HDD, and a communication section, e.g., a radio communication antenna or a wired communication connector. The storage device 52 stores teaching data (detailed later) for making the robots 10 perform the operations. The storage device 52 is configured as a common storage device for the plurality of control devices 53.

The control device 53 is configured as a conventional computer, which includes an arithmetic section, e.g., a CPU, a storage section e.g., a ROM, a RAM or an HDD, and a communication section, e.g., a radio communication antenna or a wired communication connector. By reading and executing any one of programs stored in the storage section of the control device 53, the control device 53 functions as a corresponding one of various means. Via the communication section, the control device 53 can obtain the data stored in the storage device 52, and can transmit data to the storage device 52. The arithmetic section of the control device 53 uses detection results of the sensor 51 and the teaching data from the storage device 52 to activate the corresponding robot 10, thereby making the robot 10 perform prescribed operations.

Figure 2:
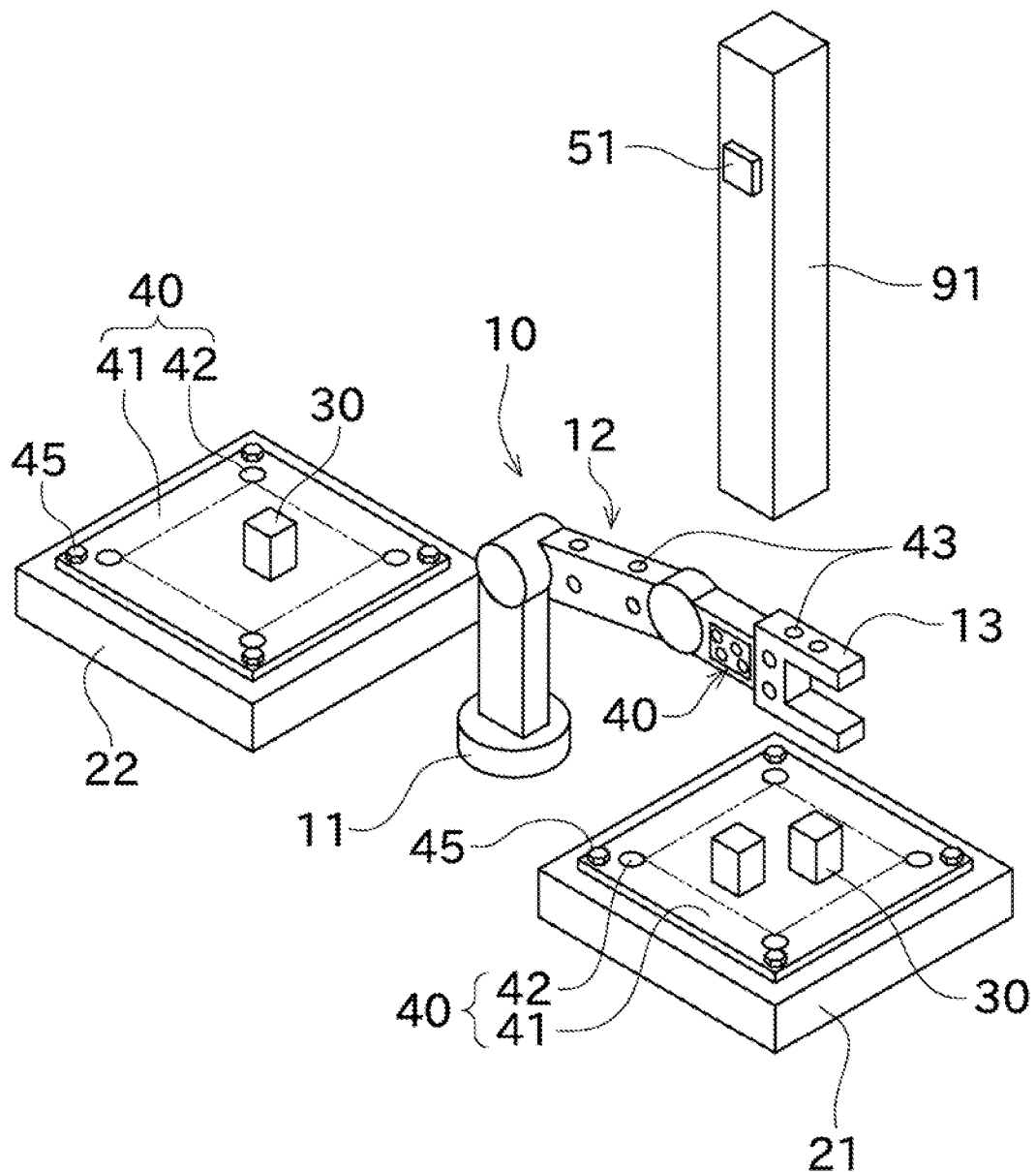
FIG. 2 A perspective view of an operation site of the robot system, illustrating a site condition and an operation performed by the robot system.

A configuration of the robot 10 and a measurement principle of the sensor 51 will now be described in detail with reference to FIG. 2. FIG. 2 is a perspective view of an operation site of the robot system 1, illustrating a site condition and an operation performed by the robot system 1.

As shown in FIG. 2, the robot 10 includes a support base 11, a robot arm 12 and an end effecter 13. The robot 10 performs operations with regard to a workpiece 30 serving as an operation object.

The support base 11 is fixed at a prescribed position in an operation site, e.g., a factory. The support base 11 is rotatable centered on a vertical rotary axis. The robot arm 12 includes arms articulated via a joint or joints. The robot arm 12 is provided with an unillustrated actuator which is moved to change a rotation angle of each joint or so on so as to change position and attitude of each arm. The end effecter 13 is a part having a function to directly handle the workpiece 30, and is attached on a tip portion of the robot arm 12. If an operation content, a shape of the workpiece 30 or so on is different, the end effecter 13 to be attached to the robot arm 12 is different. The end effecter 13 is detachably attachable to the robot arm 12, so that the end effecter 13 attached to the robot arm 12 is exchangeable for another kind of end effecter 13 corresponding to the operation content, thereby enabling the robot 10 to perform various operations.

Referring to FIG. 2, in the present embodiment, the robot 10 performs operations to convey the workpiece 30 from a first operation base 21 to a second operation base 22. Therefore, the end effecter 13 serves as a gripper which can grip the workpiece 30. The robot 10 moves the support base 11 and the robot arm 12 so as to locate the end effecter 13 at a prescribed position on the first operation base 21 close to the workpiece 30. Afterward, the robot 10 grips the workpiece 30 by using the end effecter 13. Subsequently, the robot 10 moves the support base 11 and the robot arm 12 so as to locate the end effecter 13 at a prescribed position on the second operation base 22. Then, the robot 10 releases the workpiece 30 from the gripping so as to place the workpiece 30 on the second operation base 22. The robot 10 repeats the above-mentioned series of operations.

Positional information required for the robot 10 to autonomously perform the operations of the present embodiment includes position and attitude of each of portions of the robot 10, position and attitude of the workpiece 30, and a position where the workpiece 30 should be placed. In the present embodiment, the position on the first operation base 21 where the workpiece 30 should be placed is predetermined, and the direction in which the workpiece 30 should be oriented is also predetermined. In other words, the first operation base 21 is fixed in position relative to the workpiece 30. Accordingly, the position and attitude of the workpiece 30 can be specified by specifying the position of the first operation base 21. Therefore, the sensor 51 detects the position and attitude of each of the portions of the robot 10 and the position and attitude of each of the first and second operation bases 21 and 22. In the following description, an object whose position and attitude are to be detected may be referred to as a measurement object.

In the present embodiment, markers 42 and 43 are attached to the measurement objects, i.e., the first operation base 21, the second operation base 22 and the portions of the robot 10. The sensor 51 detects a three-dimensional position (hereinafter simply referred to as "position") of each of the markers 42 and 43 so as to detect the position and attitude of the measurement object. In this regard, in the description, each of the markers serving as parts of a later-discussed marker unit 40 is designated by the reference numeral 42, and each of the markers other than the markers 42 is designated by the reference numeral 43. Both the markers 42 and the markers 43 are identical in structure. The position and attitude of each measurement object can be specified by specifying each of generally three points on the corresponding measurement object.

Incidentally, if at least either the position or attitude of the measurement object is regulated (for example, if the measurement object is unrotatably attached, or if the measurement object is attached just movably in a limited direction along a rail), the position and attitude of the measurement object can be specified based on positions of the two or less markers 42 and/or 43. Therefore, in the following description, a phrase "positions of three markers 42 and/or 43" can be reworded to another phrase "positions of N markers 42 and/or 43, N being defined as the minimum number of markers 42 and/or 43 for specifying the position and attitude of the measurement object".

In the present embodiment, the positions of the markers 42 and 43 are detected by using TOF (Time Of Flight). The TOF means a method for calculating a distance between two points in correspondence to a time taken for a receiver to receive electromagnetic waves transmitted from a transmitter. More specifically, in the present embodiment, the sensor 51 includes a plurality of receivers (e.g., a first receiver and a second receiver), and each of the markers 42 and 43 includes a transmitter. Due to the TOF, a distance from each transmitter to the first receiver and a distance from each transmitter to the second receiver can be calculated. Since the position of the sensor 51 (i.e., the position of the first receiver and the position of the second receiver) is predetermined, the positions of the respective transmitters (i.e., the positions of the respective markers 42 and 43) can be calculated by hyperbolic positioning, triangulation or so on. Especially, by transmitting different electromagnetic waves to the respective markers 42 and 43, the markers 42 and 43 can be identified for detection of their respective positions. If an alternative system is employed so as to mutually exchange the positions between the receivers and the transmitters, the positions of the receivers can be calculated on the same principle.

An alternative system may be configured so that the sensor 51 transmits electromagnetic waves and the markers 42 and 43 reflect the electromagnetic waves. In this alternative system, the positions of the markers 42 and 43 can be detected in the same way as mentioned above based on the time from the transmission of electromagnetic waves from the sensor 51 until the reception of reflected electromagnetic waves by the sensor 51. In this regard, for example, electromagnetic waves to be reflected by the respective markers 42 and 43 (i.e., the respective reflected waves) may differ in wavelength so that the sensor 51 can identify each of the markers 42 and 43 and detect the position of each of the markers 42 and 43. Information for identifying the respective markers 42 and 43 (e.g., the individual electromagnetic waves therefrom, the wavelengths of reflected waves therefrom, their distinctive patterns or shapes) is associated with identification information used by the control device 53 to specify each of the markers 42 and 43, and is stored in the storage device 52.

As mentioned above, three positions must be specified to specify the position and attitude of the measurement object. Therefore, at least three markers 42 and/or 43 are provided in each movable range. Especially, a total of four or more markers 42 and/or 43 are attached on each of various surfaces of the robot 10 because which of the various surfaces of the robot 10 is faced to the sensor 51 depends on what angles of the respective joints are. Preferably, of the four markers 42 and/or 43, three or more markers 42 and/or 43 are not disposed on a straight line because specification of three markers 42 and/or 43 on a straight line may not achieve uniquely positional specification of the measurement object. Similarly, a total of four or more (in this embodiment, four) markers 42 are attached on each of the first and second operation bases 21 and 22. Due to the configuration, even if the position of one of the markers 42 and/or 43 cannot be detected because of change of the measurement object in position and attitude, an obstacle other than the measurement object, or for another reason, the position of the measurement object can be specified by using the residual markers 42 and/or 43.

The position and attitude of the end effecter 13 which performs an operation with regard to the workpiece 30 is the most important among the positions and attitudes of the respective portions of the robot 10. Therefore, in the present embodiment, a density of the markers 42 and/or 43 attached on the end effecter 13 (e.g., the number of the markers per unit area or volume) is higher than those on the robot arm 12 and the support base 11. The position and attitude of a portion of the end effecter 13 to contact the workpiece 30 (in this embodiment, an inside surface of the tip of the gripper) are furthermore important. Therefore, further preferably, the markers 42 and/or 43 are attached on the portion to contact the workpiece 30 or any portion movable integrally with the portion to contact the workpiece 30.

Incidentally, as mentioned above, the end effecter 13 is exchangeable in correspondence to the operation contents. Preferably, many markers 42 and/or 43 are attached close to an attachment position of the end effecter 13 (i.e., an utmost end of the robot arm 12) so as to enable the robot system 1 to autonomously perform an operation to exchange the end effecter 13.

Since the position of the sensor 51 must be predetermined, the sensor 51 is fixed at a position (in this embodiment, a column 91) unmovable regardless of progress of an operation. Alternatively, the sensor 51 may be movable as mentioned in a later-discussed second embodiment as far as the position of the sensor 51 can be specified.

As understood from the foregoing description, many markers 42 and 43 are needed to detect the position and attitude of the measurement object in the manner of the present embodiment. Therefore, in the present embodiment, marker units 40 each of which collects the markers 42 are used. Hereinafter detailed description will be given of the marker units 40.

In the present embodiment, the marker units 40 are attached to the first operation base 21, the second operation base 22, and the robot arm 12. Each of the marker units 40 includes a base section 41 and a plurality of markers 42.

The base section 41 is a base to which the markers 42 are attached. In the present embodiment, the base section 41 is formed in a flat plate-like shape. The base section 41 may be formed in another shape. The base section 41 is detachably attachable to the measurement object. More specifically, as shown in FIG. 1, the base section 41 is attached to the first or second operation base 21 or 22 by bolts 45, thereby being detachably attachable.

Therefore, the marker units 40 can be easily exchanged in correspondence to operation contents. Especially, the attachment of the marker unit 40 with the bolts 45 facilitates location of the base section 41 relative to the first or second operation base 21 or 22 in comparison with bonding of that with adhesive agent, for example. Instead of the fixing with bolts, for example, one of the first operation base 21 and the base section 41 may be formed with a projection, and the other formed with a groove, so that the projection can be fitted into the groove, thereby achieving the detachable attachment of the marker unit 40. Similarly, the marker units 41 provided to the robot 10 are also configured so as to be detachably attachable to the robot 10.

The markers 42 are attached to the base section 41. The markers 42 are fixed to the base section 41 by adhesive agent or so on. Alternatively, the markers 42 may be detachably attached to the base section 41. The number of the attached markers 42 is two or more, or is N or more as mentioned above. As mentioned above, the N+1 or more markers 42 are attached to the base section 41 in consideration of a risk such that one of the markers 42 becomes unable to be detected by the sensor 51. The positions of the markers 42 relative to the base section 41 are immovably fixed. Incidentally, the number of the markers 42 attached to the base section 41 may be N+2 or more. Alternatively, the number of the markers 42 attached to one base section 41 may be N−1 or less if they are used together with the markers 42 of another marker unit 40 or the markers 43.

Due to the marker unit 40, the plurality of markers 42 are collectively handleable, thereby lightening labor for attaching the markers 42. As for another advantage, if the robot 10 should be controlled to perform the same operation, the marker unit 40 having the same arrangement of the markers 42 can be used so that later-discussed teaching data for activating the robot 10 can be shared.

The marker unit 40 attached to the robot arm 12 is used to detect the position and attitude of the robot arm 12. The respective marker units 40 attached to the first and second operation bases 21 and 22 are used to detect positions of respective operation areas (in this embodiment, a position where the workpiece 30 is placed before conveyance and a position where the workpiece 30 is placed after conveyance). The first operation base 21 is also used to detect the position and attitude of the workpiece 30 because the first operation base 21 is fixed in position relative to the workpiece 30. In this way, each marker unit 40 can be used for various purposes.

Figure 3:
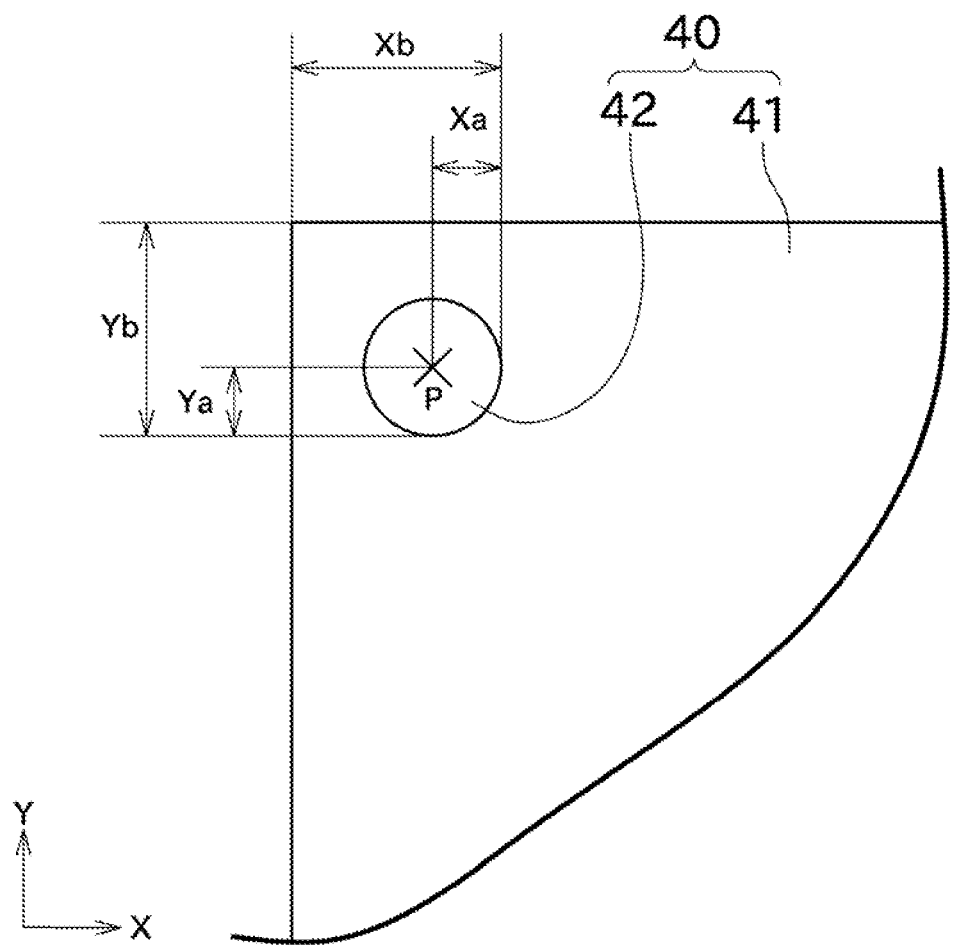
FIG. 3 A diagram illustrating distances from a reference position of a marker to an outline of a marker unit.

Although each of the markers 42 and 43 has a prescribed size, each of positions of the markers 42 and 43 detected in the above-mentioned way is indicated as a point (one coordinate). This point is referred to as a reference point. In the present embodiment, referring to FIG. 3, a distance (Xa and Ya in FIG. 3) from a reference point P to an outer circumference of the marker 42 is predetermined. Similarly, a distance (Xb and Yb in FIG. 3) from the reference point P to an outer periphery of the marker unit 40 (i.e., the base section 41) is predetermined. These values may be shared among the plurality of markers 42 and 43. In the present embodiment, Xa and Ya are mutually identical in length, and Xb and Yb are mutually identical in length. Alternatively, Xa and Ya may be different in length from each other, and Xb and Yb may be different in length from each other.

Incidentally, the markers 43 may be welded or adhered to the measurement object directly, or may be attached to the measurement object via a jig. The jig may be detachably attachable to the measurement object, similarly to the base section 41. The marker may be sandwiched between the measurement object and the jig attached to the measurement object so as to be attached to the measurement object.

Figure 4:
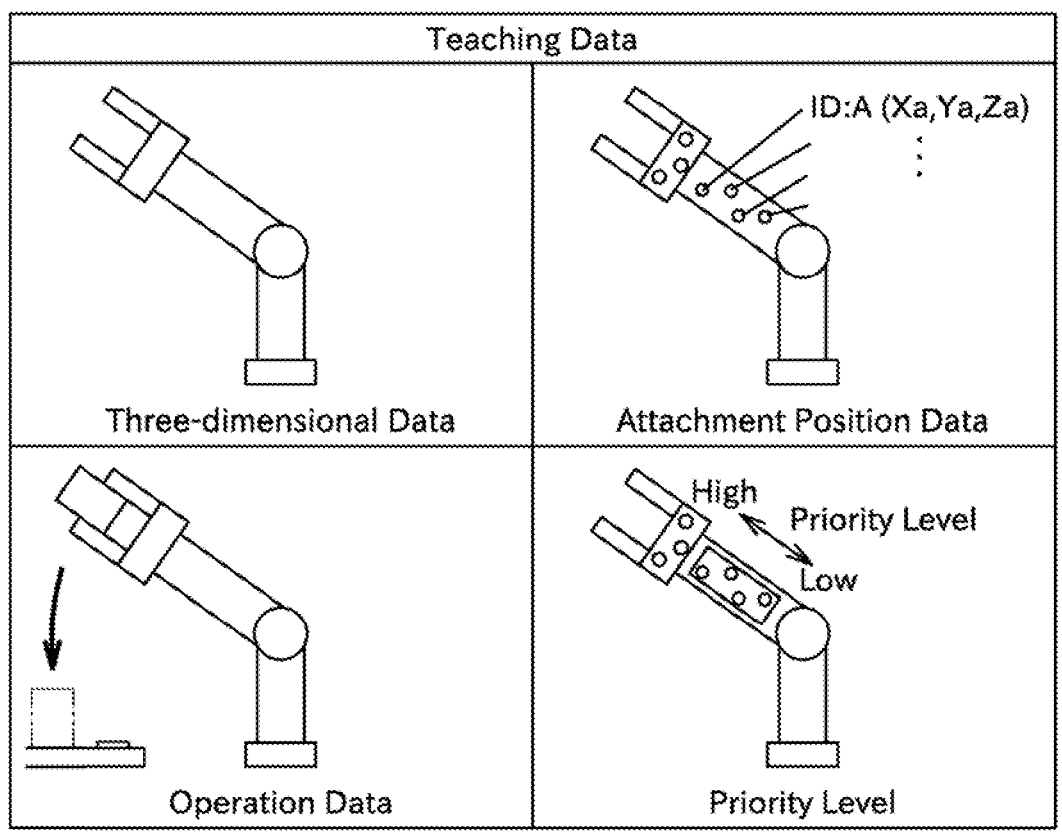
FIG. 4 A diagram illustrating contents of teaching data stored in a storage device.
Figure 5:
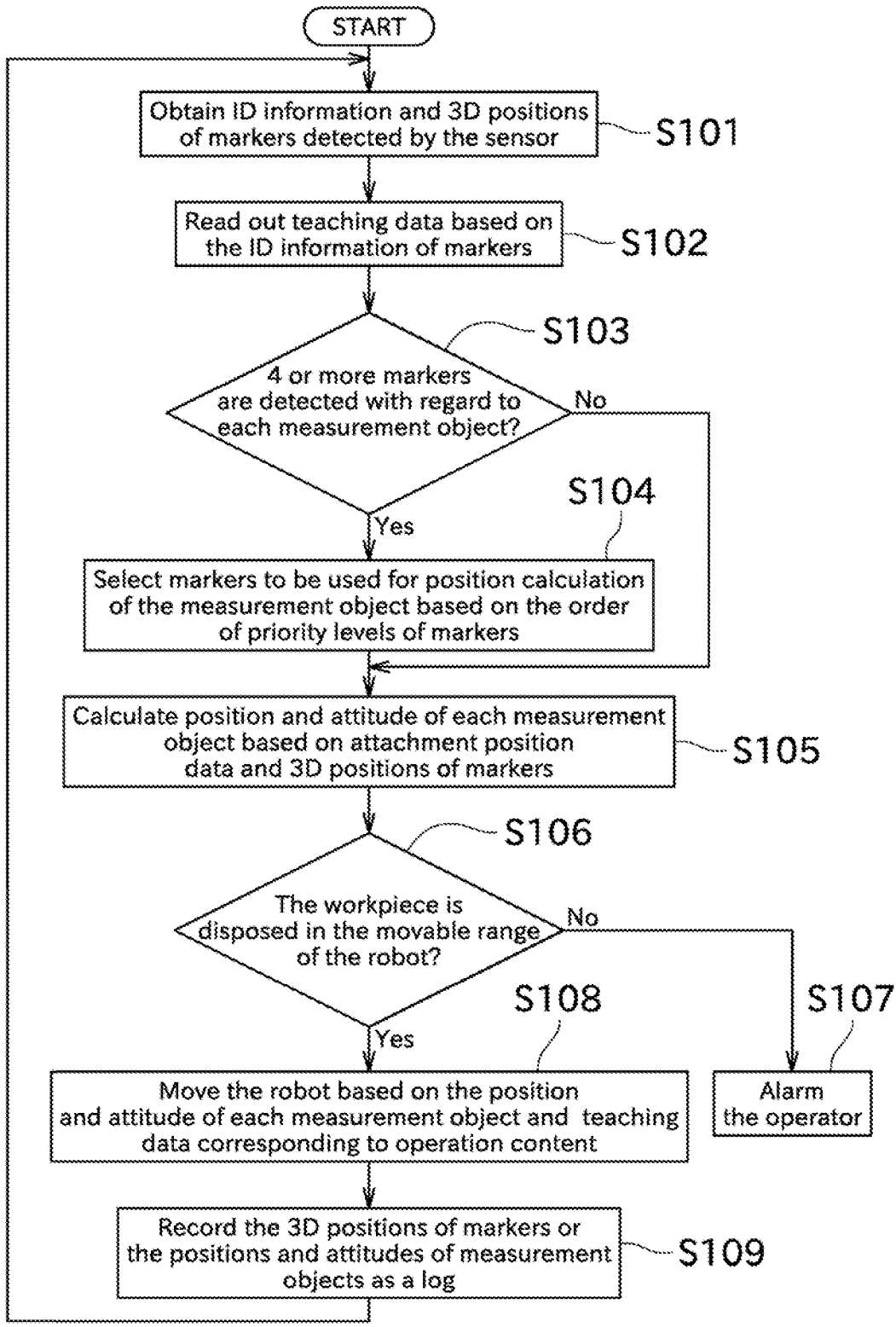
FIG. 5 A flowchart illustrating a control performed by a control device.

A flow of actual operation processes performed by the robot system 1 will now be described with reference to FIGS. 4 and 5. FIG. 4 is a diagram illustrating contents of the teaching data stored in the storage device 52. FIG. 5 is a flowchart of the control performed by the control device 53.

The teaching data is previously produced and stored in the storage device 52 before the robot system 1 is operated. The teaching data means data for making the robots 10 perform operations. More specifically, the teaching data of the present embodiment includes three-dimensional data, attachment position data, operation data, and priority levels.

The three-dimensional data is data indicating three-dimensional models, e.g., the robots 10, the workpieces 30, and their surrounding environments (e.g., the first operation bases 21, the second operation bases 22, and columns 91). Only three-dimensional data regarding one or some of the enumerated objects may be stored, or only a part of any object may be stored.

The attachment position data means data indicating a correspondence relationship between identification information regarding each of the markers 42 and 43 and an attachment position of each of the markers 42 and 43. The attachment position means data indicating which of the measurement objects the markers 42 and/or 43 are attached to, and which positions on the measurement object the markers 42 and/or 43 are attached at. Therefore, each attachment position is described by using a coordinate on the three-dimensional data of the measurement object, for example. The attachment position data is information for specifying the position and attitude of each measurement object when the identification information regarding the markers 42 and/or 43 and their positions are detected.

The operation data means data indicating contents of operations performed by the robots 10. In the present embodiment, the operation data includes an initial position of each workpiece 30 (i.e., a position of the workpiece 30 relative to each of the markers 42 on the first operation base 21), movements of the robot 10 for gripping the workpiece 30 (e.g., movements for making the end effecter 13 access the initial position of the workpiece 30, and an opening degree of the end effecter 13), a target position of the workpiece 30 (i.e., a position of the workpiece 30 relative to each of the markers 42 on the second operation base 22), movements of the robot 10 for moving the workpiece 30 to the target position and releasing the workpiece 30 from the gripping (e.g., movements for making the end effecter 13 access the target position of the workpiece 30, and an order for placing the workpiece 30 at the target position). Description of the control for making the robot 10 move along with the detected information and the taught order is omitted because it is conventional.

The markers 42 and 43 are each set to have its distinctive identification information, and each identification information is stored in association with the corresponding measurement object. Accordingly, the robot 10 can distinguish the first operation base 21 and the second operation base 22 from each other even if the marker unit 40 attached to the first operation base 21 and the marker unit 40 attached to the second operation base 22 are identical in structure. Therefore, the control device 53 controls the robot 10 so that the operation to grip the workpiece 30 is performed by the robot 10 with regard to the first operation base 21, and the operation to release the workpiece 30 from the gripping is performed by the robot 10 with regard to the second operation base 22. In other words, an operation is determined based on the identification information regarding each of the markers 42 and 43.

The priority levels mean information for determining which of the markers 42 and/or 43 should be used preferentially in the process of specifying the position of the measurement object when the N or more markers 42 and/or 43 are detected as mentioned above. For example, when the N+1 markers 42 and/or 43 are detected with regard to one measurement object, the N markers 42 and/or 43 of high priority levels are used to calculate the position of the measurement object. There are various manners to assign the priority levels. For example, with regard to the robot arm 12, preferably, the closer to the workpiece 30 or the end effecter 13 the marker 42 or 43 is, the higher the priority level assigned for the marker 42 or 43 is. Therefore, the operation can be performed more appropriately to the workpiece 30. The priority level assignment manner may be different according to change of the operation content.

A processing performed by the control device 53 along with the flowchart of FIG. 5 will now be described. The control device 53 obtains the identification information and position regarding each of the markers 42 and/or 43 detected by the sensor 51 as mentioned above (S101).

Subsequently, the control device 53 reads out the teaching data from the control device 53 based on the identification information regarding the markers 42 and/or 43 (S102). The markers 42 disposed on the first and second operation bases 21 and 22 differ from those on the robot 10 in that they are members used exclusively for the operation regarding the present embodiment. Therefore, the control device 53 reads out the teaching data regarding this operation from the storage device 52 based on the identification information regarding the markers 42. In the present embodiment, the storage device 52 is connected to the control devices 53 via a network so that when new robots 10 and new storage devices 52 are introduced, installation of the teaching data into each of the new storage devices 52 is not needed to make the new robots 10 perform the operation. Especially, if all the robots 10 are made to perform an identical operation, the teaching data required to activate the respective robots 10 are mutually identical or similar regardless of structural difference among the robots 10, thereby lightening labor for individual settings. Therefore, in the present embodiment, the two sets of robot 10 and control device 53 use the identical teaching data. Incidentally, in the present specification, the identical teaching data means not only teaching data consisting of the completely identical data but also teaching data having a slight difference caused by slight adjustment for adaption to the different robots 10.

Subsequently, the control device 53 judges whether or not the four or more (i.e., N+1 or more) markers are detected with regard to one measurement object (S103). When the control device 53 judges that the four or more markers are detected with regard to foresaid one measurement object, the control device 53 selects the markers 42 and/or 43 to be used for calculation of the position of the measurement object based on the priority levels of the markers as mentioned above (S104).

Subsequently, the control device 53 calculates the position and attitude of each of the measurement objects based on the attachment position data read from the storage device 52 and the positions of the markers 42 and/or 43 obtained from the sensor 51 (S105). The attachment position data includes the identification information regarding the respective markers 42 and/or 43 and the attachment positions of the respective markers 42 and/or 43. The control device 53 obtains the identification information and present positions of the markers 42 and/or 43 from the sensor 51. Therefore, where the prescribed positions on the three-dimensional data (i.e., the attachment positions of the markers 42 and/or 43) are currently located can be specified by using the identification information regarding the markers 42 and/or 43.

Subsequently, the control device 53 detects whether or not the workpiece 30 exists within the movable range of the robot 10 (S106). The movable range of the robot 10 means a range where the end effecter 13 can reach by changing the angles of joints of the robot arm 12. In other words, the robot 10 cannot perform the operation unless the workpiece 30 is disposed within the movable range of the robot 10.

When the workpiece 30 is absent from the movable range of the robot 10, the control device 53 alarms an operator of the absence (S107). Similarly, the control device 53 may be configured so that when the control device 53 recognizes a danger that the robot 10 will collide with another object if the robot 10 performs the operation, the control device 53 alarms the operator of the danger. The danger recognition can be based on the movable range of the robot 10 when performing the operation, the three-dimensional data and position of the operation site, and so on.

When the workpiece 30 exists in the movable range of the robot 10, the control device 53 commands the robot 10 to act based on the position and attitude of each measurement object (in this embodiment, each of the robot 10, the first operation base 21 and the second operation base 22) and the teaching data read out from the storage device 52, thereby making the robot 10 perform the operation with regard to the workpiece 30 (S108).

Subsequently, the control device 53 records the positions of the markers 42 and/or 43 or the position and attitude of each measurement object as a log (S109). The log record enables follow-up reviews of whether or not the robot 10 correctly acted, whether or not the operation was performed appropriately to the workpiece 30, or so on. The log may be inputted into a management software of a production system managing the robot system 1. Based on the inputting, the management software of the production system can grasp a production error so as to prevent the production error, or can grasp a production delay and a position where the delay occurs.

The control device 53 can proceed with the operation by repeating the above-mentioned processes of steps S101 to S109.

As mentioned above, in the present embodiment, actual positions of the robot 10, the first operation base 21 (the workpiece 30) and so on are measured so that an operation is performed based on a result of the measurements. If a sensor for the measurement were not used, there might be a manner in which, for example, movements (e.g., rotation angles of respective joints) of the robot 10 are predetermined, and teaching is performed to make the robot 10 perform the movements. If this manner were used, a high quality location mechanism or so on would be required because a high accuracy is required to set the initial positions or so on of the robot 10, the workpiece 30 and so on. On the contrary, according to the present embodiment, an economic mechanism can be used because actual positions are measured so that the robot 10, the workpiece 30 and so on do not need high accuracy in setting their initial positions or so on.

Figure 6:
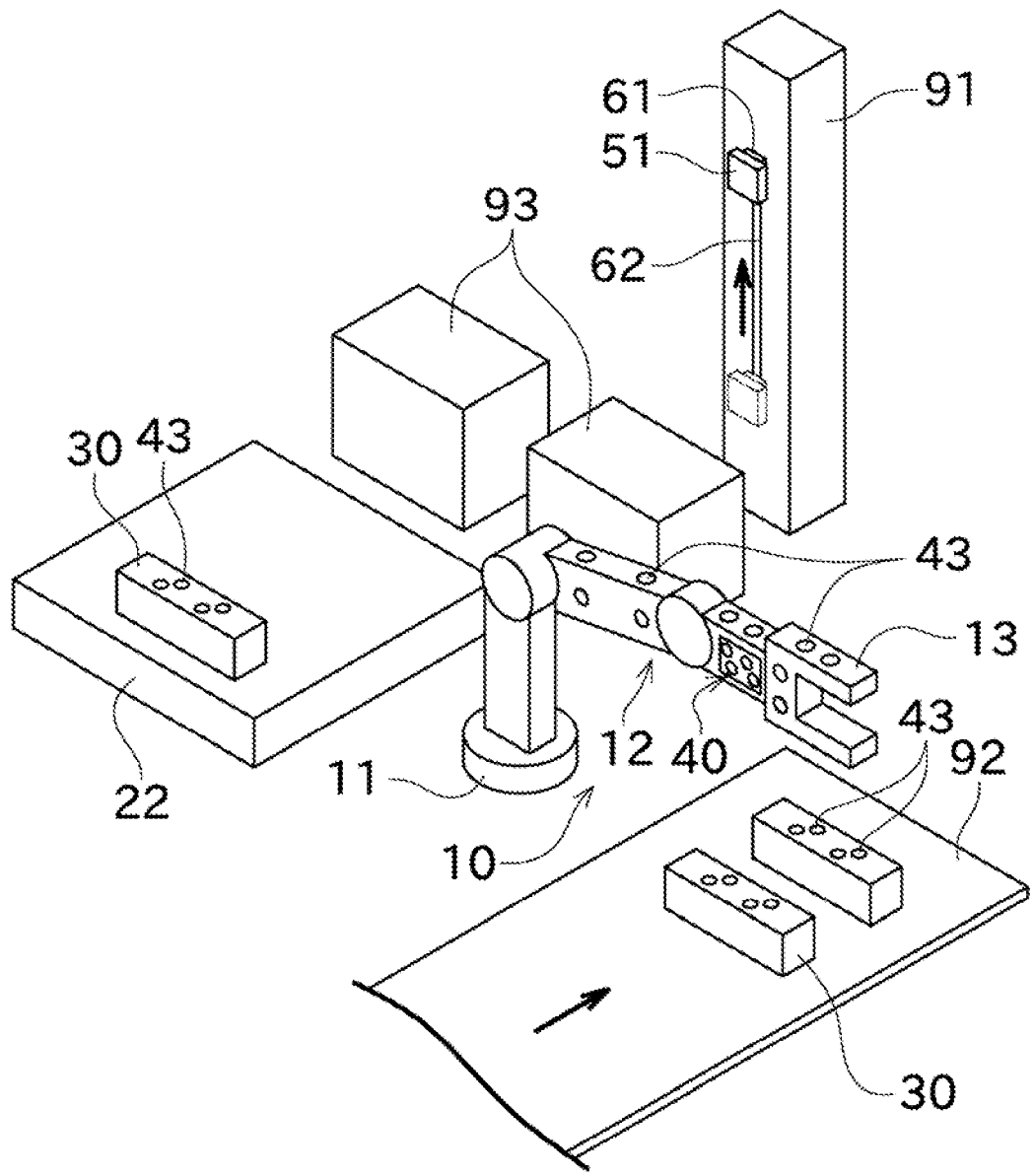
FIG. 6 A perspective view of an operation site of a robot system according to a second embodiment, illustrating a site condition and an operation performed by the robot system.

A second embodiment will now be described. FIG. 6 is a perspective view of an operation site of the robot system 1 according to the second embodiment, illustrating a site condition and an operation performed by the robot system 1. In the second embodiment and a later-discussed third embodiment, members identical or similar to those in the first embodiment are designated by the same reference numerals, and description of the members may be omitted.

The point of the second embodiment distinguished from the first embodiment is that the sensor 51 is movable. More specifically, the sensor 51 is attached to a movement device 61. The movement device 61 is driven by an electric motor (not shown) or so on controlled by the control device 53 so as to travel along a rail 62 formed on the column 91. Therefore, the control device 53 can calculate a position of the sensor 51 after the movement of the sensor 51, thereby enabling calculation of the positions of the markers 42 and/or 43.

As mentioned above, the positions of N markers 42 and/or 43 must be specified to specify the position and attitude of each measurement object. Therefore, the sensor 51 is disposed at a position where the sensor 51 can detect N+1 or more markers 42 and/or 43 with regard to each of the measurement objects. Nevertheless, the operation site varies in situation. Referring to FIG. 6, an event may happen that, because an obstacle 93 is placed or for another reason, the last detectable marker 42 or 43 becomes undetectable so that the sensor 51 can merely detect N−1 markers 42 and/or 43 at the most with regard to some one of the measurement objects. When this event is detected, the control device 53 controls the movement device 61 to move the sensor 51 while the control device 53 continuously detects the positions of the markers 42 and/or 43. The control device 53 stops the movement device 61 when the moved movement device 61 reaches a position where N or more markers 42 and/or 43 can be detected with regard to each of all the measurement objects. Accordingly, the operation with the robot 10 can be continued again.

In the second embodiment, the markers 42 and/or 43 are attached on the workpiece 30 in comparison with the first embodiment in which the markers 42 and/or 43 are not attached on the workpiece 30 but on the first and second operation bases 21 and 22 (i.e., members defining the operation arears or members dealt as parts of the operation areas). Therefore, the position and attitude of the workpiece 30 can be specified even if the position and attitude of the workpiece 30 are not fixed (or even if the position or attitude error of the workpiece 30 is large). As a result, referring to FIG. 6, the operation can be performed with regard to the workpiece 30 even while the workpiece 30 is moved by a belt conveyer 92 or so on.

Figure 7:
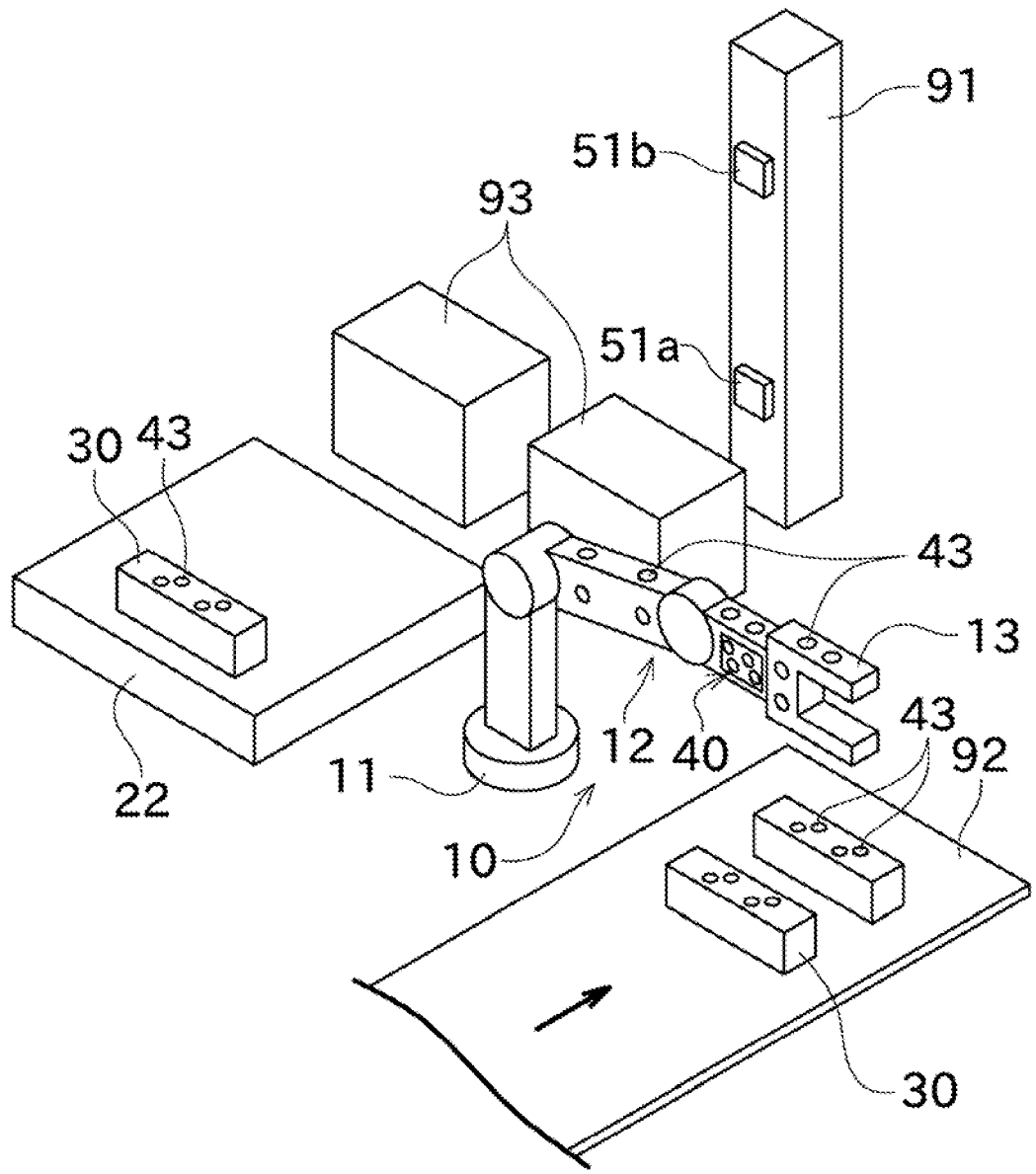
FIG. 7 A perspective view of an operation site of a robot system according to a third embodiment, illustrating a site condition and an operation performed by the robot system.

A third embodiment will now be described. FIG. 7 is a perspective view of an operation site of the robot system 1 according to the third embodiment, illustrating a site condition and an operation performed by the robot system 1.

The point of the third embodiment distinguished from the first embodiment is that a plurality of sensors 51 (more specifically, two sensors 51) are arranged. In the following description, the two sensors 51 are referred to as a first sensor 51a and a second sensor 51b. Therefore, if there is a measurement object whose position and attitude cannot be detected by one sensor (in other words, if there is a measurement object having markers 42 and/or 43 only N or less markers 42 and/or 43 of which can be detected by one sensor), the position and attitude of the measurement object can be detected by the other sensor, thereby continuing the operation with the robot 10.

If individual detection results of the first and second sensors 51a and 51b are used, respective coordinate systems of the first and second sensors 51a and 51b must match with each other. More specifically, the first sensor 51a measures a position of a marker, and the second sensor 51b detects the position of the same marker. Then, the coordinate system of the first marker 51a is converted to the coordinate system of the second sensor 51b so that the two detection results become the same coordinate, thereby matching the two coordinate systems with each other. If the measurement of one marker is not enough to match the coordinate systems, a plurality of markers are measured in the same way. Generally, as a result of this kind of measurement, simultaneous equations including unknown numbers that are parameters regarding the position and attitude in the coordinate system of the first sensor 51a are obtained. By solving the simultaneous equations, or by using an optimization method such as a least squares method, the parameters regarding the position and attitude in the coordinate system of the second sensor 51b are determined.

The second embodiment and the third embodiment may be combined. In other words, a plurality of sensors 51 may be arranged and they may be movable.

As described above, according to any one of the above-mentioned embodiments, the robot system 1 comprises the robot 10, the marker unit 40, the sensor 51, the storage device 52, and the control device 53. The robot 10 performs an operation with regard to the workpiece 30 serving as the operation object in the operation site. The marker unit 40 is attached to the measurement object which is at least one of the workpiece 30, the robot 10, the object fixed in position relative to the workpiece 30 (i.e., the first operation base 21 in the first embodiment), and the member defining the operation area (i.e., the first operation base 21 and the second operation base 22 in the first embodiment), and includes the base section and the plurality of markers 42 attached to the base section. The sensor 51 detects the identification information and three-dimensional positions of the plurality of markers 42 included in the marker unit 41. The storage device 52 stores the teaching data including the attachment position data indicating the correspondence relationship between the identification information of each of the markers 42 and the attachment position of the corresponding marker 42 and the operation data indicating the operation content of the operation performed by the robot 10. The control device 53 calculates the three-dimensional position of the measurement object based on the three-dimensional positions of the plurality of markers 42 detected by the sensor 51 and the attachment position data stored in the storage device 52, and controls the robot 10 based on the three-dimensional position of the measurement object and the operation data so as to make the robot 10 perform the operation.

Therefore, the three-dimensional positions of the markers 42 are detected so that the operation can be performed in consideration of the accurate three-dimensional position of the measurement object. The marker unit 40 enables collective handling of the markers 42, thereby lightening labor for arranging the markers 42.

In the robot system 1 according to any one of the above-mentioned embodiments, the robot 10 and the marker unit 40 are each pluralized so that the plurality of robots 10 and the plurality of marker units 40 are arranged in the robot system 1. The control device 53 uses the common teaching data to individually control the plurality of robots 10.

Therefore, the teaching data can be shared so that the robot system 1 including the plurality of robots 10 can be operated by a simple process.

In the robot system 1 according to any one of the above-mentioned embodiments, the marker unit 40 is attached to each of the first operation base 21 and the second operation base 22 each of which serves as the member defining the operation area. Based on the positions of the plurality of markers 42 detected by the sensor 51, the control device 53 positionally specifies the operation area where the robot 10 performs the operation.

Therefore, the marker unit 40 can be used to specify the operation area.

In the robot system 1 according to any one of the above-mentioned embodiments, on the assumption that the minimum required number of the markers whose three-dimensional positions must be measured to specify the position and attitude of the measurement object is referred to as N, the number of the markers 42 included in the marker unit 41 is at least N+1.

Therefore, even if any one of the N markers 42 becomes undetectable because it enters a blind area or for another reason, the position of the measurement object can be specified based on the positions of the other markers 42.

Further, in the robot system 1 according to the above-mentioned embodiment, the storage device 52 stores priority levels each of which is associated with the identification information of each of the markers 42. When the N+1 or more markers 42 are detected, the control device 53 uses the three-dimensional positions of the N markers 42 in the order of the priority levels to calculate the three-dimensional position of the measurement object.

Therefore, the positions of the markers 42 having high priority levels are adopted according to the priority order so that the position detection can be improved in accuracy, for example.

In the robot system 1 according to any one of the above-mentioned embodiments, the marker unit 40 is detachably attachable to the measurement object.

Therefore, the detachably attachable marker unit 40 can be easily adapted to another robot 10 or another operation site.

In the robot system 1 according to any one of the above-mentioned embodiments, the storage device 52 stores the three-dimensional data of the measurement object. The control device 53 specifies the position and attitude of the measurement object based on the positions of the markers 42 detected by the sensor 51 and the three-dimensional data of the measurement object.

Therefore, a portion of the measurement object out of the markers 42 attached thereto can be positionally specified.

The robot system 1 according to one of the above-mentioned embodiments comprise the movement device 61 for moving the sensor 51. The movement device 61 moves the sensor 51 when any one of the markers 42 is determined to become undetectable.

Therefore, due to the movement of the sensor 51, the marker 42 may become detectable again.

In the robot system 1 according to one of the above-mentioned embodiments, the sensor 51 includes the first sensor 51a and the second sensor 51a. The first sensor 51a is disposed at the first position. The second sensor 51b is disposed at the second position that is different from the first position. When any one of the markers 42 cannot be detected by the first sensor 51a, the control device 53 uses the second sensor 51b to detect the marker 42 which cannot be detected by the first sensor 51a.

Therefore, the plurality of markers 42 can be detected stably.

The above description is given of preferred embodiments of the present invention, however, the above-mentioned configuration can be modified as follows, for example.

In each of the above-mentioned embodiments, when the four or more markers 42 and/or 43 are detected, three markers 42 and/or 43 are selected according to the priority order so that the three-dimensional positions of the respective selected markers 42 and/or 43 are detected. Alternatively, the four or more markers 42 and/or 43 can be used for detection of their three-dimensional positions. More specifically, a plurality of marker sets each of which consists of the minimum numbered markers required for the position and attitude determination of the measurement object may be selected and positionally measured, the position and attitude of the measurement object may be determined based on the measurement result of each of the marker sets, and the position and attitude of the measurement object may be finally determined based on the measurement results. For example, the finally determined position and attitude of the measurement object may be based on an average of the positions and attitudes determined based on the respective measurement results of the respective marker sets regarding the measurement object. To calculate the average, priority levels corresponding to the operation content or so on may be given to the respective markers, and priority levels corresponding to the priority levels of the markers may be given to the respective marker sets, and the position and attitude of the measurement object may be finally determined based on the weighted average corresponding to the priority levels of the respective marker sets.

In each of the above-mentioned embodiments, the teaching data is stored in the common storage device 52 shared among the plurality of control devices 53. Alternatively, the control devices 53 may store individual teaching data, respectively.

In each of the above-mentioned embodiments, the robot 10 is provided on portions thereof with the markers 42 and/or 43. Alternatively, the markers 42 and/or 43 on the robot 10 may be omitted. More specifically, if a positional relation between the robot 10 and the marker unit 40 can be specified in any manner, the robot 10 with no marker can correctly perform the operation in the function area in the marker unit 40 because the operation in the function area of the marker unit 40 is associated with the position of each marker 42 of the marker unit 40 and is stored as the teaching data. In this regard, to specify the positional relation between the robot 10 and the marker unit 40, the marker unit 40 may be structurally fixed in position relative to the robot 10, or an online teaching may be used to inform the robot 10 regarding the position of the marker unit 40. The online teaching means a method to obtain teaching data by actually moving a robot. Any kind of sensor may be used to measure the positional relation between the robot 10 and the marker unit 40.

In each of the above-mentioned embodiments, the robot 10 cannot greatly change its position because the support base 11 of the robot 10 is positionally fixed. Alternatively, the support base 11 may be provided with wheels or so on so as to enable the robot 10 to greatly change its position.

In each of the above-mentioned embodiments, the sensor 51 is attached to the column 91. Alternatively, the sensor 51 may be attached to something in the operation site, e.g., a ceiling, a floor, or a device other than the above-mentioned devices. In the second embodiment, the sensor 51 is configured to move along the rail 62. Alternatively, the sensor 51 may be attached to something other than the robot 10 serving as the measurement object. Alternatively, the sensor 51 may be hung by a plurality of wires, so that the amounts of wound/unwound wires are controlled to move the sensor.

The flowchart indicated in each of the above-mentioned embodiments is merely exemplary. The flowchart may be modified by deleting any step, changing the order of some steps, adding another step, or so on. For example, the step S103 may be omitted if the same calculation is performed when the number of markers 42 and/or 43 is N or regardless of whether or not the number of markers 42 and/or 43 is N+1 or more.

In each of the above-mentioned embodiments, the robot is described as a kind of operation device. The present invention is adaptable to any operation device other than the robot, e.g., a construction machine, an AUV (Autonomous Underwater Vehicle), and an exploration car, as far as the operation device can be controlled in action by the control device.

DESCRIPTION OF THE REFERENCE NUMERALS

1 a robot system (an operation system)
10 a robot (an operation device)
40 a marker unit
41 a base section
42, 43 markers
51 a sensor
52 a storage device
53 a control device

The invention claimed is:

1. An operation system comprising:
  a robot configured to use an end effecter to perform an operation with regard to a workpiece serving as an operation object;
  a marker unit attached to the robot, the marker unit including a base section and a plurality of markers attached to the base section, wherein a minimum required number of the markers whose three-dimensional positions must be measured to specify a position and attitude of the robot is N, and a number of the markers included in the marker unit is at least N+1;
  a sensor configured to individually detect identification information and three-dimensional positions of each of the plurality of markers included in the marker unit, wherein the identification information of each of the plurality of markers is distinct from the identification information of each of the other markers of the plurality of markers;

a memory configured to store:
  teaching data including attachment position data and operation data, the attachment position data indicating a correspondence relationship between the identification information of each of the markers and an attachment position of the corresponding marker, and the operation data indicating operation content of the operation performed by the robot; and
  priority levels, each of which is associated with the identification information of each of the markers, the priority levels being higher for markers closer to the workpiece or the end effecter and being lower for markers further from the workpiece or the end effecter; and a controller configured to:
  calculate a three-dimensional position of the robot based on the three-dimensional positions of the plurality of markers detected by the sensor and the attachment position data stored in the memory and controls the robot based on the three-dimensional position of the robot and the operation data so as to make the robot perform the operation; and
  when the N+1 or more markers are detected, use the three-dimensional positions of N of the markers in order of the priority levels to calculate the three-dimensional position of the robot.

2. The operation system according to claim 1,
wherein the robot and the marker unit are each pluralized so that a plurality of robots and a plurality of marker units are arranged in the operation system, and wherein the controller uses common teaching data to individually control the plurality of robots.

3. The operation system according to claim 1,
wherein the marker unit is detachably attachable to the robot.

4. The operation system according to claim 1,
wherein the memory stores three-dimensional data of the robot, and
wherein the controller specifies the position and attitude of the robot based on the positions of the markers detected by the sensor and the three-dimensional data of the robot.

5. The operation system according to claim 1, further comprising:
a movement device attached to the sensor and coupled to a rail for moving the sensor along the rail,
wherein the movement device moves the sensor when any one of the markers is determined to become undetectable.

6. The operation system according to claim 1,
wherein the sensor includes:
  a first sensor disposed at a first position; and
  a second sensor disposed at a second position that is different from the first position,
wherein when any one of the markers cannot be detected by the first sensor, the controller uses the second sensor to detect the marker which cannot be detected by the first sensor.

7. The operation system according to claim 1, further comprising:
a second marker unit attached to at least one of the workpiece, an object fixed in position relative to the workpiece, and an object defining an operation area.

* * * * *